United States Patent [19]

Centner et al.

[11] 3,735,044

[45] May 22, 1973

[54] COORDINATE DETERMINING DEVICE EMPLOYING A SLOWLY VARYING DIFFERENCE SIGNAL TO DETERMINE APPROXIMATE CURSOR POSITION

[75] Inventors: Ronald M. Centner, Southfield; Vernon C. Kamm, Farmington, both of Mich.

[73] Assignee: The Bendix Corporation, Southfield, Mich.

[22] Filed: July 6, 1971

[21] Appl. No.: 159,899

[52] U.S. Cl. ....................................................178/19

[51] Int. Cl. ............................................G08c 21/00

[58] Field of Search............................178/18, 19, 20; 340/365

[56] References Cited

UNITED STATES PATENTS

| | | | |
|---|---|---|---|
| 3,647,963 | 3/1972 | Bailey | 178/19 |
| 3,598,903 | 8/1971 | Johnson | 178/18 |
| 3,461,454 | 8/1969 | Steckenrider | 178/19 |
| 3,466,646 | 9/1969 | Lewin | 178/18 |
| 3,342,935 | 9/1967 | Leifer et al. | 178/19 |

*Primary Examiner*—Kathleen H. Claffy
*Assistant Examiner*—Ken Richardson
*Attorney*—John S. Bell et al.

[57] ABSTRACT

Cursor position is determined by providing two different signals that vary cyclically in response to cursor displacement. The first signal varies at a slightly faster rate than the second. Because of this small difference in the rate of variation of the two cyclic signals, the difference between the two signals varies at a rate substantially slower than the rate at which either of the two signals vary. The difference between the two cyclic signals provides an absolute or complete determination of approximate cursor position in a relatively long interval in which the two cyclic signals oscillate through many cycles. The value of this difference signal is measured to determine approximate cursor position.

8 Claims, 3 Drawing Figures

INVENTORS
RONALD M. CENTNER
VERNON C. KAMM

BY John S. Bell
ATTORNEY

INVENTORS
RONALD M. CENTNER
VERNON C. KAMM
BY
ATTORNEY

COORDINATE DETERMINING DEVICE EMPLOYING A SLOWLY VARYING DIFFERENCE SIGNAL TO DETERMINE APPROXIMATE CURSOR POSITION

CROSS REFERENCE TO RELATED APPLICATION

A coordinate determining device that employs a difference signal to determine approximate cursor position and is therefore related to this application is disclosed in copending application Ser. No. 159,898 filed 7/6/71, which is assigned to The Bendix Corporation, assignee of this application.

BACKGROUND OF THE INVENTION

1. Field of the Invention

Coordinate determining devices.

2. Brief Description of the Prior Art

There are a number of devices that provide signals that vary cyclically in response to cursor displacement and that measure a characteristic such as the phase or amplitude of the cyclically varying signal in order to determine cursor position. Patent Application Ser. No. 805,559 "Automatic Coordinate Determining Device" by K. V. Bailey, assigned to The Bendix Corporation, discloses one such device. This application describes an electronic coordinate determining device including a conductive grid structure and a conductive cursor structure. A reference voltage is supplied to one of the two structures to induce a voltage in the other that varies cyclically in response to cursor displacement. In order to provide a signal that is a very precise representation of cursor position, the grid structure is constructed so that the induced voltage oscillates through one complete cycle in a relatively short interval, such as one inch. Cursor position can be determined to an accuracy of 1/1000 of an inch. The cyclically varying induced voltage provides a complete or absolute determination of the relative position of the cursor within one of the small, 1-inch measuring cycles. However, this signal does not indicate which cycle the cursor is in. Cursor position is determined by continually measuring the change in the induced voltage during the entire time that the cursor is being moved to provide a summation signal indicating the number of complete cycles through which the induced voltage has changed. If the cursor is lifted from the grid structure so that there is no electromagnetic coupling between the grid and cursor structures and is moved from one position to another, the induced signal measuring apparatus will not provide an accurate determination of cursor position because there will be no change in the induced voltage.

SUMMARY OF THE INVENTION

This invention comprises a device for providing an output signal indicating cursor position in which there is no need to continually record the change in any signal during cursor movement in order to determine the position of that cursor. Cursor position is determined by providing two different cursor position indicating signals that vary cyclically in response to cursor displacement. Each cycle of the two signals identifies a predetermined small interval of cursor displacement. The two signals vary at a slightly different rate so that the difference between the two signals varies at a rate substantially slower than the rate of variation of the two cyclic signals. The value of the difference signal is directly proportional to the amount of cursor displacement. Approximate cursor position is determined by measuring the magnitude of the difference signal when the cursor is located at a position of interest. A precise determination of cursor position is provided by combining the difference signal indicating approximate cursor position with one of the two cyclic signals indicating precise cursor position within a small interval.

This invention also includes apparatus for compensating for any error in a measured or determined value of the difference between the first and second cyclic signals. In the absence of any error, the difference between the first and second signals may possess one of a finite number of values for each value of one of the cyclic signals. The error compensating apparatus thus includes means for comparing a measured difference with the set of permitted differences in order to determine the permitted difference closest to a measured difference. The permitted difference closest to a measured difference is used to provide an output indicating cursor position. An error in the measured difference between the two cyclic signals that is less than the change in the measured difference caused by a one-half cycle variation in the two cyclic signals will not cause that measured difference value to vary sufficiently to change the permitted difference value that is closest to the measured difference value. The use of the closest permitted difference value to provide an output indicating cursor position thus insures that small errors in the value of the difference signal will not cause errors in the output signal indicating cursor position.

BRIEF DESCRIPTION OF THE DRAWINGS

Further objects, features, and advantages of this invention, which is defined by the appended claims, will become apparent from a consideration of the following description and the accompanying drawings in which:

DETAILED DESCRIPTION OF THE PREFERRED EMBODIMENT

Figure 1:
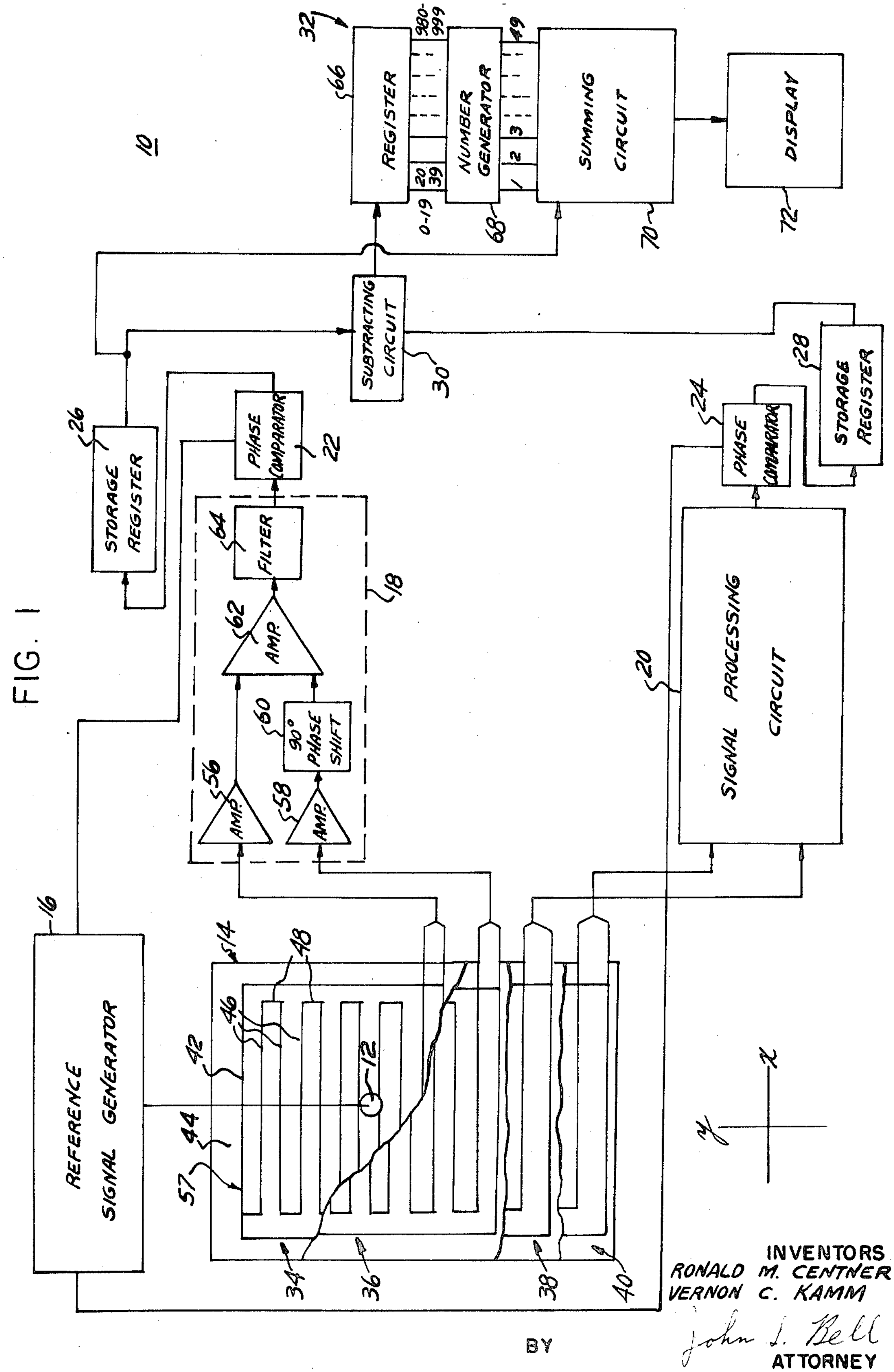
FIG. 1 is a schematic, circuit diagram of one embodiment of the position determining device of this invention.

FIG. 1 illustrates an electronic device 10 for determining the Y coordinate position of a cursor 12 on a multi-element grid structure 14. The X coordinate positions of cursor 12 can be determined using apparatus similar to that for determining Y coordinate positions. This structure is not shown in order to simplify explanation of this invention. The device 10 also includes a signal generator 16 and two signal processing circuit portions 18 and 20 for providing two different output signals having phases that vary cyclically in response to cursor displacement. In order to determine the difference between these two signals, the device 10 includes two phase comparators 22 and 24 for measuring the phase of the signals from circuit portions 18 and 20, respectively, two registers 26 and 28 for storing the measured values of those signals, and a subtracting circuit 20 for providing the difference between those two stored signals. The difference is transmitted to a circuit portion 32 which processes the difference from subtracting circuit 30 to provide an output indicating precise cursor position.

Figure 3:
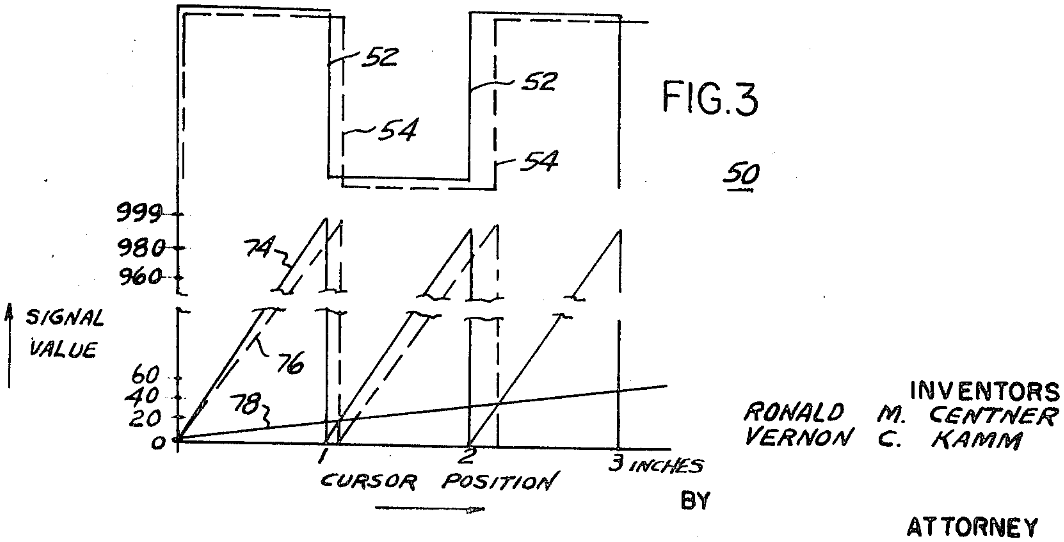
FIG. 3 is a graph that illustrates the manner in which the two cyclically varying signals and the difference between those signals provided by the apparatus of FIG. 1 varies in response to cursor displacement.

Grid structure 14 is formed from four separate grids 34, 36, 38, and 40. Each grid comprises a continuous, electrically conductive element 42 disposed on a nonconductive backing 44. The nonconductive backings 44 electrically insulate the conductive elements of the four grids from each other. The conductive element 42 of each grid is convoluted to form a plurality of long, conductive portions 46 that are alternately connected at their ends by shorter connecting portions 48. As is shown by the graph 50 of FIG. 3, grids 34 and 36 define a first set of measuring intervals 52 along the Y axis of grid structure 14. The length of each measuring interval 52 is equal to the distance between adjacent parallel portions 46 of grid 34. The spacing between the long parallel portions of grid 36 is equal to the spacing between those portions of grid 34. The conductive portions 46 of grid 36 fall midway between those of grid 34. The spacing between the parallel portions 46 of grids 38 and 40 is slightly larger than that for grids 34 and 36. Grids 38 and 40, therefore, define a second set of measuring intervals 54 along the Y axis of grid structure 14. Intervals 54 have a length equal to the spacing between parallel portions 46 of grid 38, and are therefore, slightly longer than intervals 52 defined by grids 34 and 36. The relative position of grid 40 with respect to grid 38 is similar to that of grid 36 with respect to grid 34. That is, the long parallel portions 46 of grid 40 are spaced apart a distance equal to the spacing between those portions of grid 38, and they fall midway between those portions of grid 38.

As will be explained more completely hereinafter, apparatus 18 provides an output signal having a phase that shifts through one-half cycle in response to a Y axis cursor displacement equal to one interval 52. Apparatus 20 provides an output signal having a phase that varies by one-half cycle in response to a Y axis cursor displacement equal to one interval 54. The difference between the signals provided by circuit portions or apparatuses 18 and 20 varies as a function of cursor position along the Y axis of grid structure 14 because the difference between the sizes of the intervals 52 and 54 causes the relative positions of those intervals to vary as a function of position along the Y axis. The four grids of grid structure 14 are arranged so that the measuring intervals 52 and 54 align or coincide at the edge 57 of grid structure 14. To insure that grids 34 and 38, and thus intervals 52 and 54 will not be realigned at some other position and thus cause the difference provided by subtracting circuit 30 to change through more than one cycle as cursor 12 is moved across the grid structure. The maximum Y axis distance along which measurements are made and the spacing between the long conductive portions of the various grids satisfy the equation:

$$Y \leq D^2/\Delta d \qquad (1)$$

where:

$Y$ = the maximum y axis measuring distance of grid structure 14;

$D$ = the length of the measuring interval 52 defined by grids 34 and 36; and $\Delta d$ = the difference between the length of measuring intervals 52 defined by grids 34 and 36 and measuring intervals 54 defined by grids 38 and 40.

All symbols used herein will be used consistently throughout and will, therefore, not be redefined.

One practical embodiment satisfying equation (1) that is relatively easy to construct is a grid structure in which D equals 1.0 inches and $\Delta d$ equals 0.02 inches. The difference signal provided by subtracting circuit 30 provides an unambiguous indication of approximate cursor position over a distance of 50 inches.

Signal processing apparatuses 18 and 20 are identical. They each provide an output signal having a phase that varies as a function of cursor position along the Y axis of grid structure 14. Apparatus 18 includes two amplifiers 56 and 58 for receiving and amplifying signals from grids 34 and 36, respectively. It also includes a phase shift apparatus 60 for shifting the phase of the signal from amplifier 58 by 90°, and a summation amplifier 62 for combining the signal from amplifier 56 and the phase shifted signal from apparatus 60. A filter 64 removes unwanted signal components such as noise signals from the summation signal provided by amplifier 62. As is explained more completely in the above-identified allowed application Ser. No. 805,559, the phase of the signal provided by apparatus 18 is determined solely by the relative Y axis position of cursor 12 within an interval 52. There is no need to record cursor displacement from one position to another in order to either obtain or to measure this signal. The phase of the signal provided by apparatus 18 shifts through one-half cycle in response to cursor displacement from one parallel portion 46 of grid 34 to an adjacent parallel portion of that grid. Similarly, apparatus 20 provides an output signal to comparator 24 having a phase that varies by one-half cycle in response to a cursor displacement from one parallel portion 46 of grid 38 to an adjacent parallel portion of that grid.

Circuit portion 32 for providing an output indicating cursor position includes storage register 66 for receiving and storing a signal provided by subtracting circuit 30 indicating the difference between the signals provided by circuit portions 18 and 20. The difference signal stored in register 66 is transmitted to a number generator 68. Number generator 68 provides an output indicating the number of complete Y axis intervals of cursor displacement. A summer 70 receives the output from number generator 68 which indicates the number of complete intervals of cursor displacement and the signal stored in register 26 which indicates the relative position of cursor 12 within a measuring interval 52, and provides an output that is a precise determination of cursor position to a display 72.

In operation, an excitation signal, such as a 3KHz sinusoidally varying AC signal, is supplied from generator 16 to cursor 12. This excitation signal induces voltages in each grid of the grid structure 14. Signal measuring apparatus 18 receives the induced voltages from grids 34 and 36 and provides a sinusoidally varying output signal having a phase that is determined by the relative Y axis position of cursor 12 within a measuring interval 52. Phase comparator 22 measures the phase of this signal by adding signal pulses to the signal received from apparatus 18 and counting the number of signal pulses that must be added in order to shift the phase of the signal from apparatus 18 to be in phase with a reference signal received from generator 16. Phase comparator 22 shifts the signal received from apparatus 18 through one-half cycle by adding 1,000 pulses to that signal. Since portions 46 of grid 34 are spaced 1 inch apart and apparatus 18 provides an output that varies through one-half cycle in response to an interval 52 of cursor displacement, comparator 22 provides a linearly varying cyclic output signal 74 (FIG. 3) whose value varies between 0 and 1,000 in response to an interval 52 of cursor displacement. Signal 74 is stored in register 26.

Signal processing apparatus 20 and phase comparator 24 operate in a manner similar to that of apparatus 18 and comparator 22 to provide a linear, cyclic output signal 76 that varies between 0 and 1,000 in response to an interval 54 of cursor displacement. Because intervals 52 are slightly smaller than intervals 54, signal 74 varies at a slightly faster rate than signal 76. The difference 78 between these two signals varies at a very slow rate and is an absolute indication of cursor position. Since signal 78 is simply the difference between signals 74 and 76, the device 10 is thus capable of providing an output indicating cursor position without continuously measuring and recording the position of that cursor during movement across grid structure 14. For the embodiment described herein in which D equals 1 inch, $\Delta d$ equals 0.02 inches, and signals 74 and 76 vary between 0 and 1,000, signal 78 indicates cursor position to an accuracy of one-twentieth of an inch. Signal 78 is thus an indication of approximate cursor position. And within an accuracy of one-twentieth of an inch, signal 78 possesses a unique value for each Y coordinate position of cursor 12 on the 50 inch grid structure 14.

Number generator 68 receives the signal 78 stored in register 66 and provides an output indicating the number of complete intervals of cursor displacement. Number generator 68 provides this output by dividing the value of signal 78 by 20 and eliminating any fraction obtained by that division. The output from generator 68 is transmitted to summer 70 which also receives signal 74 stored in register 26. Signal 74 represents the position of cursor 12 within an interval 52 to an accuracy of one one-thousandth of an inch. Summer 70 thus provides an output to display 72 indicating cursor position to an accuracy of one one-thousandth of an inch.

Figure 2:
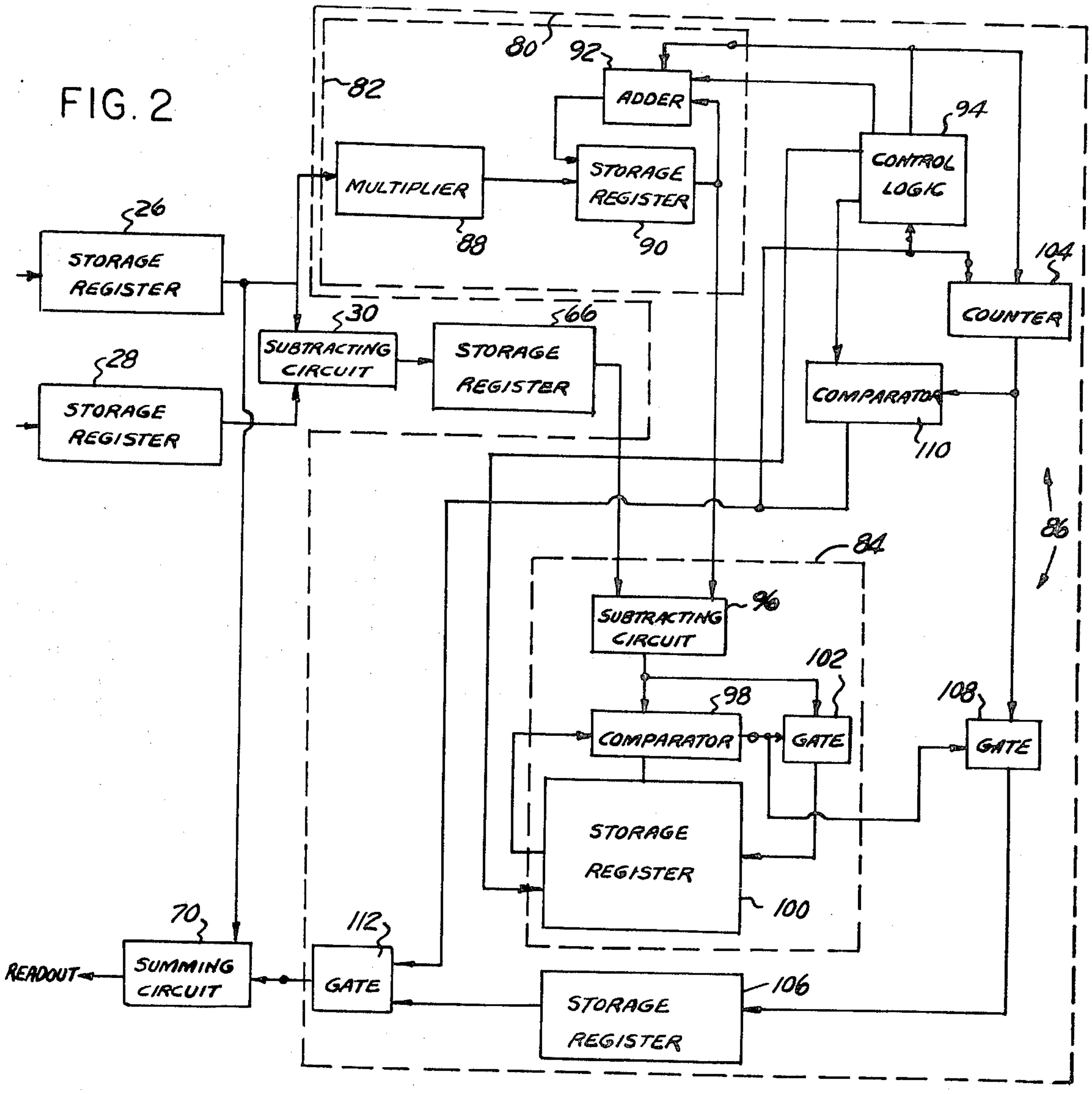
FIG. 2 is a schematic, circuit diagram of apparatus for compensating for any error in the difference signal identifying cursor position provided by the apparatus of FIG. 1.

FIG. 2 illustrates a modification 80 of the circuit of FIG. 1 that compensates for any errors in the measured value of difference signal 78 that could be caused for example by a slight misalignment of the grids forming grid structure 14. Circuit 80 provides an output indicating cursor position that is unaffected by any errors that are likely to occur in a practical, operating embodiment of this invention. As can be seen from FIG. 3, for each value of signal 74, signal 78 may have only one of a finite number of values in the absence of any error. For example, signal 74 having a value of 500 indicates that cursor 12 is either 0.5, 1.5, 2.5, 3.5, etc., inches from edge 57 of grid structure 14. And, in the absence of any error, signal 78 must have a value of either 10, 20, 30, etc. Circuit 80, therefore, includes a first circuit portion 82 for determining each value that difference signal 78 is permitted to have for a particular value of signal 74. Circuit 80 also includes a circuit portion 84 for comparing each permitted value of difference signal 78 with the actual measured value of that signal, and a circuit portion 86 for providing an output indicating the cursor position determined by the permitted difference value closest to the measured value of that signal. Because circuit 30 uses the value that difference signal 78 may have in the absence of any error that is closest to the measured value of that signal to indicate cursor position, circuit 80 provides an output that is unaffected by errors in the measured value of difference signal 78 smaller than the change that would be caused in that signal by one-half interval of cursor displacement.

Circuit portion 52 for determining each permitted value of difference signal 78 includes a multiplier 88 for receiving signals 74 from register 26 and multiplying those received signals by ($\Delta d/D$) to provide an output to a storage register 90 that is the lowest permitted value that difference signal 78 may have for the particular value of the received signal 74. An adding circuit 92 operating under the control of a control logic circuit 94 repeatedly increments the values stored in register 90 by ($\Delta d/D$) to provide the entire sequence of permitted values for signal 78.

Circuit portion 84 for comparing the sequence of permitted values of difference signal 78 to the actual measured value of that signal includes a subtracting or difference circuit 96 for determining the difference between the measured value of difference signal 78 stored in register 66 and each permitted value of that signal generated by circuit portion 82. Circuit portion 84 also includes a comparator 98, a storage register 100, and a gate 102. Comparator 98 receives signals from subtracting circuit 96 and storage register 100, and provides an output signal opening gate 102 whenever the difference provided by circuit 96 is smaller than the value stored in register 100. Comparator 98 and gate 102 thus cause the difference between the permitted value of signal 78 closest to the actual measured value of that signal to be stored in register 100.

Circuit portion 86 for providing an output indicating the cursor position represented by the permitted value of difference signal 78 closest to the actual measured value of that signal includes a counter 104 and storage register 106. Counter 104 is cleared at the beginning of a comparison between a measured value of a difference signal 78 and the sequence of permitted values for that signal, and is incremented by one each time adder 92 adds the value ($\Delta d/D$) to register 90. The number stored in counter 104 at any instant thus represents the number of complete intervals of cursor displacement corresponding to the value of the permitted difference signal transmitted to subtracting circuit 96 at that instant. A gate 108, which is opened by a signal from comparator 98 whenever a permitted value of difference signal 78 is found to be closer to the actual measured value of that signal than the previously examined permitted values, controls the transmission of information from counter 104 to register 106. The opening of gate 108 causes the number provided by counter 104 to replace any previous number stored in register 106. The number stored in register 106 after the entire sequence of permitted values for difference signal 78 have been compared to the measured value of that difference signal indicates the number of complete Y intervals 52 represented by the permitted value of difference signal 78 closest to the actual measured value of that signal. A comparator 110 and gate 112 control the transmission of the number stored in register 106 to summer 70. Comparator 110 receives a reference signal from control circuit 94 equal to the total number of difference values that signal 78 may have for a particular value of signal 74. Comparator 110 compares this integer with each number generated by counter 104 and provides an output signal opening gate 112 when the two values are equal. The value of difference signal 78 closest to the measured value of that signal is then transmitted to summer 70 which also receives signal 78 from register 26 and combines these two signals to provide an output that precisely identifies cursor position.

Circuit 80 may be operated to continuously compare each value of difference signal 78 with each permitted value for that signal as the cursor is being moved. Or, circuit 80 may be activated only when the cursor is at a point of interest to compare the measured difference value at that point with the sequence of permitted difference values. In operation, control logic 94 initiates operation of circuit 80 by placing a large number in register 100, by setting counter 104 to zero, and by providing a reference signal as described previously to comparator 110 causing a large number to be stored in register 100. Multiplier 88 then receives signal 74 from register 26 and provides an output to register 90 comprising the smallest value difference signal 78 is permitted to have for the received value of signal 74 in the absence of any error. Adding circuit 92 sequentially increments this value by $(\Delta d/D)$ to generate the entire sequence of permitted values for signal 78. Control logic 94 increments the value stored in counter 104 each time adder 92 increments the value stored in register 90 so that the number stored in counter 92 represents the number of complete intervals of cursor displacement represented by the permitted value of difference signal 78 stored in register 90. Subtracting circuit 96 compares each permitted value of signal 78 to the actual measured value of that signal whenever the difference provided by subtracting circuit 96 is smaller than the value stored in register 100. Comparator 98 opens gates 102 and 108 causing the difference provided by subtracting circuit 96 to replace the value stored in register 100 and the interval indicating number provided by counter 104 to replace the value stored in register 106. When the number provided by counter 104 reaches the total number of different values that signal 78 may have for one value of signal 74, comparator 110 opens gate 112 and allows the number stored in register 106 to be transmitted to summer 70. Summer 70 provides an output that precisely identifies cursor position and that is unaffected by any reasonable error in signal 78.

Having thus described two embodiments of this invention, a number of modifications will occur to those skilled in the art. For example, many other structures can be used to obtain cyclic signals that vary at a slightly different rate so that the difference between those cyclic signals comprises a slowly varying signal that is an absolute indication of approximate cursor position. Such signals could be obtained from a plurality of optical gratings with the spacing between the lines of one grating being slightly larger than the spacing between the lines of another. Or, such signals may be provided electronically without using means for establishing intervals of different lengths.

Therefore, what is claimed is:

1. A device for determining the position of a cursor comprising:

means providing a first cursor position indicating signal that varies monotonically in response to cursor displacement and shifts instantaneously to a predetermined value at predetermined cursor positions to thereby comprise a cyclic signal with each cycle identifying a predetermined interval of cursor displacement;

means providing a second cyclic cursor position indicating signal that shifts instantaneously to a predetermined value at predetermined cursor positions and varies monotonically in response to cursor displacement at a slightly slower rate than said first signal so that the difference between said first and second signals has a unique value for each cursor position along a distance over which both said first and said second signals vary through a plurality of cycles;

means for determining the difference between said first and second signals; and means responsive to said determined difference for providing an output indicating cursor position.

2. The device of claim 1 in which:

said first signal providing means includes means defining a first set of substantially equal, adjacent measuring intervals along a selected dimension, and said first signal shifting instantaneously to said predetermined value at the beginning of each interval and varying monotonically as the cursor is moved in one direction through an interval to indicate the relative position of said cursor within said interval;

said means providing said second signal includes means defining a second set of substantially equal, adjacent measuring intervals along said selected dimension, said intervals of said second set being slightly larger than said intervals of said first set, and said second signal shifting instantaneously to said predetermined value at the beginning of each interval of said second set and varying monotonically as the cursor is moved in said one direction through a second set interval to indicate the relative position of said cursor within said second set interval; and said difference is directly proportional to the distance along said selected dimension between a reference position and said cursor.

3. The device of claim 2 wherein said means for providing an output indicating cursor position include:

means for using said difference to identify the number of complete intervals of cursor displacement from the reference position, said number of intervals being an indication of approximate cursor position; and means for using one of said cyclic signals to identify cursor position within an interval, said indication of approximate cursor position and said identified position within an interval together providing a precise indication of cursor position.

4. The device of claim 2 wherein said first signal comprises a sawtooth signal that has a first value whenever said cursor is positioned at one edge of a measuring interval of said first set of measuring intervals, that has a second value whenever said cursor is positioned at an opposite edge of a measuring interval of said first set, and that varies linearly in response to cursor movement from said one edge to said opposite edge of a measuring interval of said first set of measuring intervals; and said second signal comprises a sawtooth signal that has a first value whenever said cursor is positioned at one edge of a measuring interval of said second set, and that has a second value whenever said cursor is positioned at the opposite edge of a measuring interval of said second set, and that varies linearly in response to cursor displacement from said one edge to said opposite edge of a measuring interval of said second set of measuring intervals.

5. The device of claim 2 wherein the lengths of said intervals of said first and second sets satisfy the equation:

$$\Delta d \leq (D^2/Y)$$

where:

$\Delta d$ = the difference between the length of a measuring interval of said first set and the length of a measuring interval of said second set;

$D$ = the length of a measuring interval of said first set; and $Y$ = the length of said first and second sets along which measurements are to be made;

said dimensions of said intervals thereby preventing said difference signal from having the same value for different cursor positions along said selected dimension that are separated by a substantial distance.

6. The device of claim 5 wherein said means defining said first and said second sets of measuring intervals comprise electrically conductive grid means.

7. The device of claim 2 further including means for compensating for any error in said determined difference between said first and second signals comprising:

means for determining each value that said difference may have for each value of said first signal in the absence of any error;

means for comparing said determined difference with each of said permitted differences to determine the permitted difference value closest to said determined difference;

means for utilizing said closest permitted difference value to provide a readout signal indicating cursor position, said readout signal being unaffected by errors in said difference signal smaller than the change in said difference signal caused by cursor displacement of one-half of one of said measuring intervals.

8. The device of claim 7 wherein said utilization means includes:

means providing a third signal indicating the cursor position represented by said closest permitted difference value; and means for combining said first and third signals to provide said readout signal, said readout signal thereby being a precise indication of cursor position.

* * * * *